US00RE40244E

(19) United States
(12) Reissued Patent
Sheffield, Jr. et al.

(10) Patent Number: US RE40,244 E
(45) Date of Reissued Patent: Apr. 15, 2008

(54) VACUUM ACTUATED DISPLAY ORNAMENTS

(75) Inventors: Douglas M. Sheffield, Jr., Chesterfield, MO (US); Tamara K. Sheffield, Chesterfield, MO (US)

(73) Assignee: We-Flex, LLC, Chesterfield, MO (US)

(21) Appl. No.: 11/127,018
(22) Filed: May 11, 2005

Related U.S. Patent Documents

Reissue of:
(64) Patent No.: 6,136,392
Issued: Oct. 24, 2000
Appl. No.: 08/914,628
Filed: Aug. 19, 1997

U.S. Applications:
(63) Continuation of application No. 08/212,150, filed on Mar. 14, 1994, now Pat. No. 5,714,215.

(51) Int. Cl.
*B32B 1/00* (2006.01)
*G09F 21/04* (2006.01)
*A47G 1/17* (2006.01)

(52) U.S. Cl. ..... 428/34.1; 428/31; 428/192; 428/195; 428/337; 428/913; 428/332; 428/195.1; 40/611; 40/618; 40/591; 40/597; 40/603; 40/604; 40/593; 248/309.3; 248/467; 248/901; 248/205.5; 293/117; 296/136; 296/97.7; 296/95.1; 296/901; 280/1; 280/727

(58) Field of Classification Search ..... 428/34.1, 428/31, 192, 195, 337, 913, 332; 40/591, 40/597, 611, 618, 603, 604, 593; 248/309.3, 248/467, 901, 205.5; 293/117; 296/136, 97.7, 296/95.1, 901; 280/1, 727
See application file for complete search history.

(56) References Cited

U.S. PATENT DOCUMENTS

| | | | | |
|---|---|---|---|---|
| 1,076,250 | A | 10/1913 | Ulrich | 40/597 |
| 1,922,900 | A | 8/1933 | Plante | 40/597 |
| 1,932,154 | A | 10/1933 | Briggs | 40/597 |
| 2,206,159 | A | 7/1940 | Burgard | |
| 2,559,163 | A | 7/1951 | MacDonald | 40/592 |
| 4,052,806 | A | 10/1977 | George | 40/592 |
| 4,196,882 | A | 4/1980 | Rognon | 248/309.3 |
| 4,426,723 | A | 1/1984 | Rouse | 40/597 |
| 5,042,772 | A | 8/1991 | Madjeski | 248/467 |
| 5,077,925 | A | 1/1992 | Herrera et al. | 40/611 |
| 5,078,356 | A | 1/1992 | Adams | |
| 5,080,941 | A | 1/1992 | Kosowan | 40/597 |
| 5,131,177 | A | 7/1992 | Sy, Jr. | 40/597 |
| 5,133,524 | A | 7/1992 | Liu | |
| 5,176,346 | A | 1/1993 | Liu | |
| D340,181 | S | 10/1993 | Adams et al. | |
| 5,405,112 | A | 4/1995 | Trethewey | |
| 5,714,215 | A | 2/1998 | Sheffield et al. | 428/34.1 |
| D416,783 | S | 11/1999 | Hampshire | |

*Primary Examiner*—Marc A. Patterson
(74) *Attorney, Agent, or Firm*—Alston & Bird LLP

(57) ABSTRACT

Improved vacuum actuated display ornaments which adhere to surfaces by self-suction are improved by a wall thickness at the center of mass thicker than their peripheral wall thickness.

19 Claims, 4 Drawing Sheets

VACUUM ACTUATED DISPLAY ORNAMENTS

Matter enclosed in heavy brackets [ ] appears in the original patent but forms no part of this reissue specification; matter printed in italics indicates the additions made by reissue.

This is a continuation of application Ser. No. 08/212,150, filed on Mar. 14, 1994, now U.S. Pat. No. 5,714,215.

BACKGROUND OF THE INVENTION

1. Field of Invention

This invention relates to display ornaments and, more specifically, to display ornaments which intimately adhere to surfaces, such as the glass surface of a bathroom mirror, through self-suction.

2. Brief Description of Prior Art

A multitude of adhesive display ornaments are provided to the general public for the purpose of advertising and promotion. Typically, an ornament to a convenient surface for future reference. However, once the ornament has been mounted several problems arise. The ornament itself may deteriorate or the message on the ornament becomes dated, creating the desired to remove the ornament. Removal of the ornament all too often leads to substrate damage from the adhesive used or an unsightly residue may remain.

In an effort to eliminate this problem, an alternative class of display ornaments, such as magnetic backed ornaments, has been created for temporary display of information without damaging the underlying substrate. For example, there ornaments enable one to temporarily display invaluable health-related information in a convenient location, such as the front panel of a refrigerator, for quick access during an emergency. However, such an ornament suffers the disadvantage of being limited to use on metal substrates. We believe that a customized display ornament which affords one the opportunity to temporarily display information from a variety of locations, such as a bathroom mirror, a ceramic shower surround or the front panel of a refrigerator, would be a welcomed advancement to the art.

SUMMARY OF THE INVENTION

The present invention comprises an improved display ornament which adheres to substrates such as metal, plastic or glass, through self-suction. Said ornaments have predetermined shapes and are formed from a unitary or one-piece sheet of flexible material, preferably resinous thermoplastic material. Said shaped and flexible materials have a convex exterior surface and a concave interior surface, both of which are suitable for affixing a printed message. The interior surface of said ornament forms a concave cavity of measurable depth. Said cavity enables said ornament to adhere to surfaces when said cavity is compressed against a surface, which in turn creates an adhesive force through vacuum suction when said ornament flexes as it attempts to return to its original shape. The wall thickness of said ornament can be uniform but, preferably, the wall thickness varies, with the general area containing the center of mass (M) of said ornament being about ⅛" thick, and tapering to approximately 1/16" thick along its periphery. The periphery of said ornaments is custom shaped to meet the specific decorative requirement of the manufacturer.

DETAILED DESCRIPTION OF THE INVENTION

Figure 1:
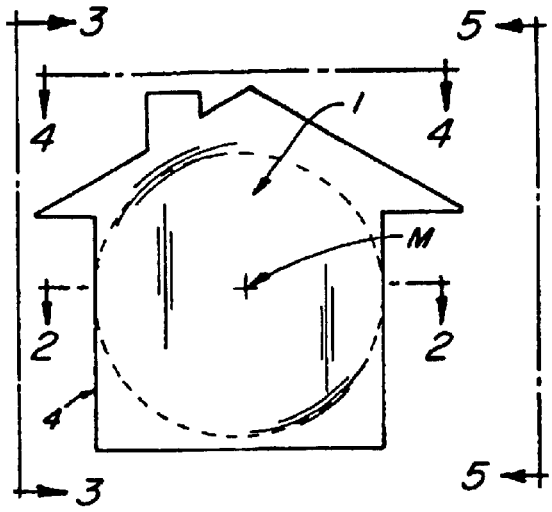
FIG. 1 is a top perspective of the convex exterior surface of one embodiment of a display ornament in accordance with said invention.
Figure 3:
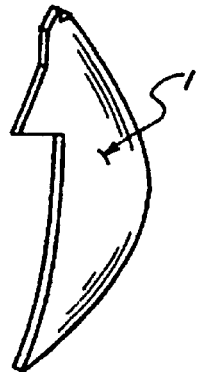
FIG. 3 is a side perspective of said embodiment in a pre-compressed shape as viewed from the direction of line 3—3.
Figure 4:
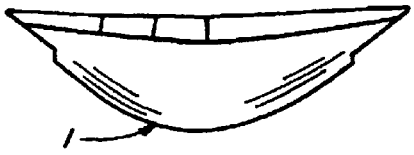
FIG. 4 is a frontal perspective of said embodiment in a pre-compressed shape as viewed from the direction of line 4—4.
Figure 2:
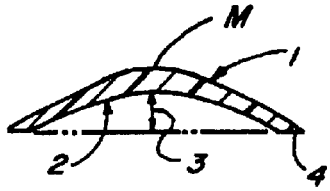
FIG. 2 is a cross-sectional view of one end of the display ornament along line 2—2 of FIGS. 1 and 5.
Figure 5:
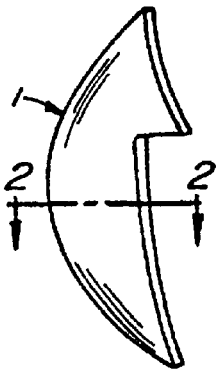
FIG. 5 is a side perspective of said embodiment in a pre-compressed shape as viewed from the direction of line 2—2.

Referring first to FIGS. 1 to 5, one embodiment of a display ornament, made in accordance with the invention, comprises simply a unitary, flexible sheet of material which forms a predetermined shape of a house. Said ornament has a convex exterior surface 1 and a concave interior surface 2, both of which are suitable for affixing a printed message. The interior surface of said ornament forms a concave cavity 3 of measurable depth as illustrated in FIG. 2. Periphery 4 of said ornament is custom shaped, for example, to form the shape of a house, to suit the design requirements of the manufacturer.

Figure 10:
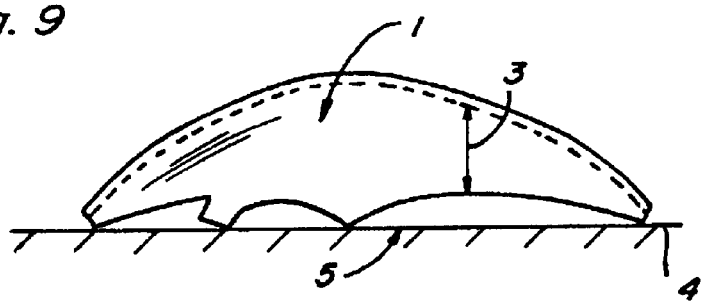
FIG. 10 is a side perspective of FIG. 9 from the direction of line 3—3 of FIG. 1 when said ornament is resting on a substrate while in a "relaxed" shape.
Figure 11:
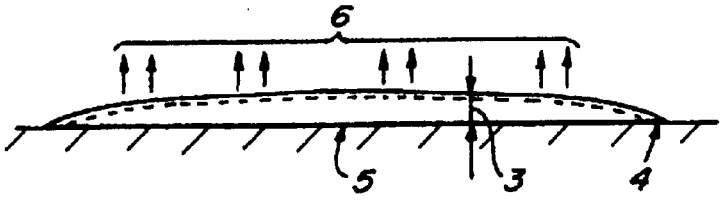
FIG. 11 is a side perspective of FIG. 9 from the direction of line 3—3 of FIG. 1 when said ornament rests on a substrate when in a flattened, compressed shape.

Interior concave cavity 3 of said ornament can be seen in FIGS. 10 and 11. The interior concave cavity of said ornament enables adhesion to surfaces by generating a vacuum suction when said ornament is in a flattened, compressed shape as illustrated in FIG. 11. When in said compressed shape, periphery 4 of said ornament rests snugly against substrate 5 so as to form a continuous seal. Said seal maintains the vacuum suction force generated within the interior concave cavity of said ornament. It should be noted that, depending on the selected embodiment of said ornament, beveled periphery 4 does not necessarily lie continuously flush against substrate 5 when in a pre-compressed shape as illustrated in FIG. 10. However, when compressed, said periphery in turn properly mates against substrate 5 to form a continuous seal, thereby enabling attachment to said substrate.

The shape of said display ornament is preferably molded from a flexible sheet of thermoplastic resinous material such as vinyls, e.g., polyvinyl chloride. The wall thickness of said ornament can be uniform, in the case of symmetrical shapes, but for non-symmetrical shapes, the wall thickness must vary with the general area containing the center of mass M of said ornament being, for example, about ⅛" thick for polyvinyl chloride, and tapering to approximately 1/16" thick along periphery 4 when the object has a surface area of about 5 square inches; that is, taper is 50%. Tapering the wall thickness is required when constructing irregular and/or unsymmetrically shaped display ornaments.

Figure 6:
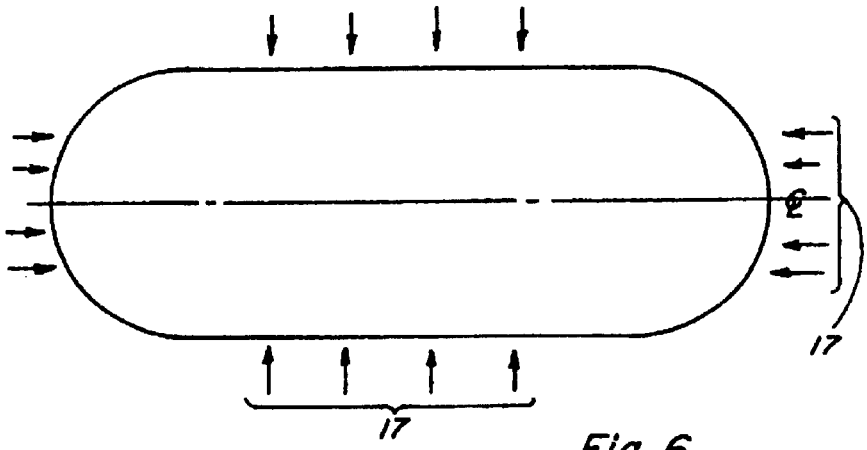
FIG. 6 is a top perspective of the convex exterior surface of a symmetrical, rectangular shaped display ornament.
Figure 7:
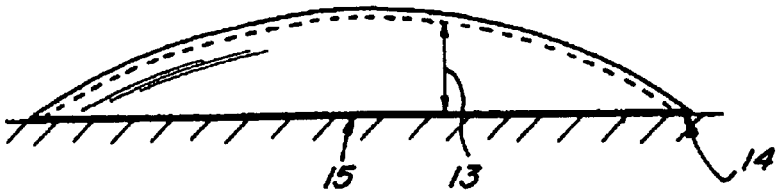
FIG. 7 is a side view of the ornament of FIG. 6 when said ornament is resting on a substrate while in a "relaxed" shape.
Figure 8:
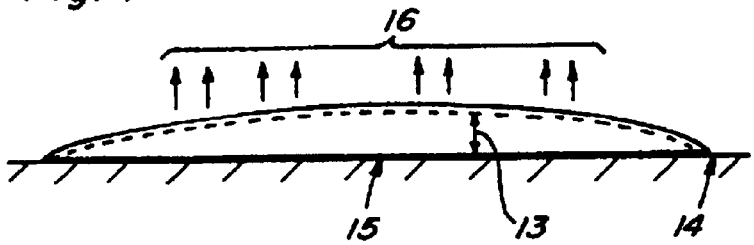
FIG. 8 is a side view of the ornament of FIG. 6 when said ornament rests on a substrate when in a flattened, compressed shape.
Figure 9:
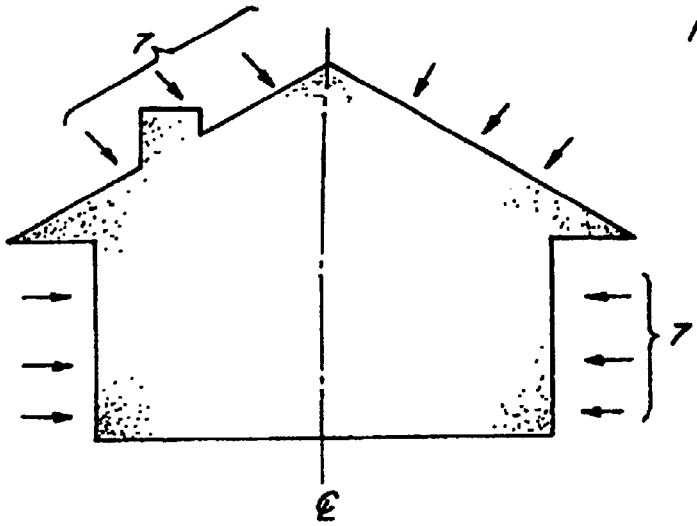
FIG. 9 is a top view of the convex exterior surface of an unsymmetrical, house-shaped display ornament.

Referring to FIGS. 6 to 8, we have found that when a symmetrically shaped ornament having uniform wall thickness, such as a rectangular shaped ornament, is compressed, then an upward/outward flexural force 16 is generated which, in turn, generates horizontal, frictional force 17 as said ornament flexes in an effort to return to its original pre-compressed shape. It is believed said force is uniformly distributed throughout the periphery of said ornament, and can be equally divided into two parts by a plane of symmetry which bisects said ornament. The magnitude of said force is directed along said plane of symmetry and perpendicular to horizontal plane 15 on which said ornament rests as illustrated in FIG. 8. As a result, adhesion to horizontal plane 15 is achieved, since the uniformly distributed force in turn causes an even vacuum seal to be formed along periphery 14 of said symmetrical ornament. However, a plane of symmetry does not exist in the case of irregular or unsymmetrically shaped display ornaments as illustrated in FIG. 9. Therefore, when an unsymmetrically shaped display ornament, having uniform wall thickness, is compressed and attempts to "flex" back into its original pre-compressed shape, then an irregular flexural force 6 is generated. Consequently, an irregular horizontal, frictional force 7 is generated in reference to a plane which attempts to bisect said ornament as well. As a result, adhesion to surfaces is adversely affected, since portions of periphery 4 are subjected to varying degrees of force, thereby enabling portions of said periphery to pull away from the surface of attachment and releasing the vacuum seal formed along periphery 4 as illustrated in FIG. 10.

Figure 13:
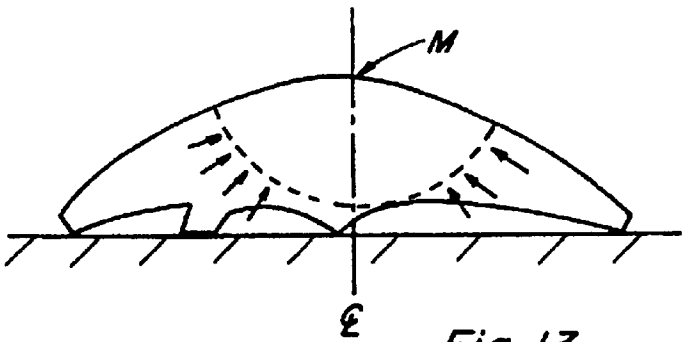
FIG. 13 is a side view of FIG. 12 and said core when said ornament rests on a substrate when in a "relaxed" shape.
Figure 12:
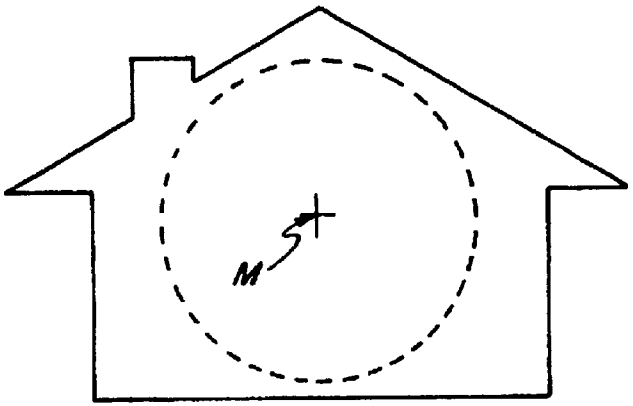
FIG. 12 is a top view of the convex exterior surface of an unsymmetrical, house shaped display ornament having a symmetrically shaped conical core.
Figure 14:
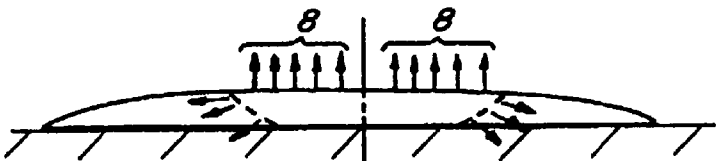
FIG. 14 is a side view of FIG. 12 and said core when said ornament rests on a substrate when in a flattened, compressed shape.
Figure 16:
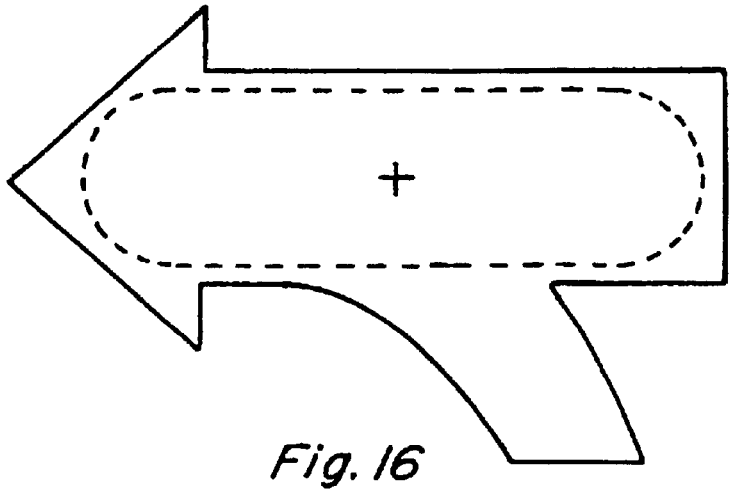

We have found that this problem can be overcome by molding the curved body of said ornament in a manner whereby the wall thickness of the central portion of said ornament tapers by 50% (for shapes having surface areas from 3 $in^2$ to 25 $in^2$). This forms a symmetrically shaped core about the general area encompassing center of mass M of said ornament as illustrated in FIGS. 12 to 14. Said core is particularly of value because it provides a localized region within said irregularly or unsymmetrically shaped ornament which itself is symmetrical in reference to an axis of rotation located at center of Mass M of said ornament.

Referring to FIGS. 13 and 14, we have discovered that said region helps stabilize the irregular flexural properties associated with irregularly or unsymmetrically shaped ornaments by generating a flexural force 8 which is itself uniformly distributed and concentrated throughout the central cavity area of said ornament. Therefore, the primary function of said core is to provide a secondary flexural force of magnitude capable of compensating for the irregular flexural force associated with the overall irregular shape of said ornament.

Preferably, said core is conical shaped. It is believed an unlimited combination of cavity dimensions exists, such as base width and cavity depth, which will enable said core to generate a flexural force capable of offsetting said irregular flexural forces. For example, we have found that the overall area of, and weight contained within, a conical shaped core can vary greatly depending on the material used to construct said ornament and the selected embodiment of the invention. For example, when using polyvinyl chloride to construct an ornament similar to the embodiment illustrated in FIG. 12, it is discovered that the core occupies approximately 57% of the total area of said ornament, and at least 75% of the overall weight of said ornament is contained within said core. Whereas, when molding the embodiment illustrated in FIG. 15, it is found that a conical shaped core is formed such that it occupies at least 42% of the total area of said ornament, and contains at least 50% of the overall weight of said ornament. Preferably, the overall area of said ornament is from about 3 square inches to about 25 square inches, and the depth of interior concave cavity 3 at the center of mass M is at least about ½", given the above described features of said conical core.

Figure 15:
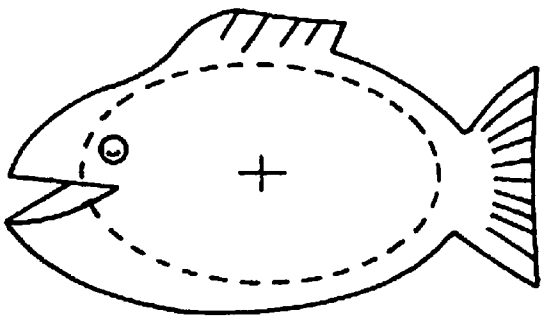
FIGS. 15 to 18 depict various embodiments of display ornaments made in accordance with said invention.
Figure 17:
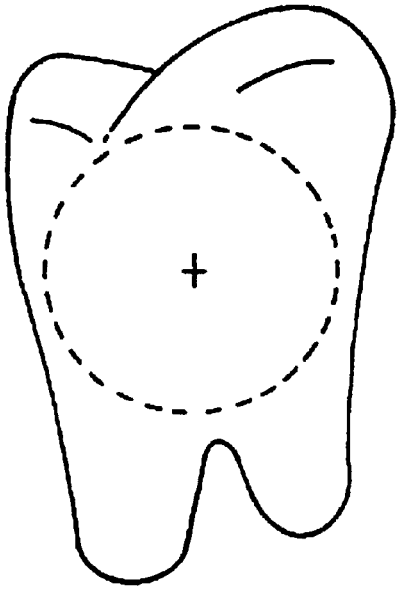
Figure 18:
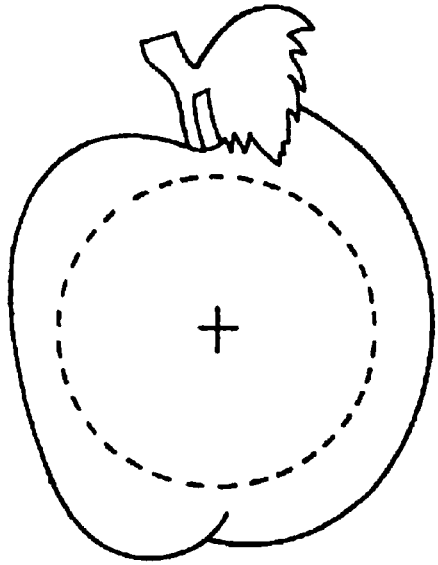

The periphery of the display ornament is custom shaped so as to provide the manufacturer with a degree of flexibility in meeting their design requirements. For example, FIG. 15 depicts a display ornament customized for display in a local pet shop. FIG. 17 is illustrative of a display ornament having customized shape in the form of a tooth for display in a dental office, whereas said ornament might be shaped in the form of an apple when addressing the display objective of a local produce store as illustrated in FIG. 18.

We have identified a number of manufacturing processes which can be utilized to mold the curved body of said display ornament. One useful method is injection molding. When injection molding said ornament, it is believed an extreme amount of pressure is applied to force a pelletized form of the material, such as vinyls, into a cavity heated to a specified temperature. Once the material has filled the cavity and the desired shape formed, the part is then ejected from the cavity, allowed to cool and the cycle repeated.

The curved body of said injection molded ornament can be utilized to conveniently display information. For example, information can be displayed by directly printing, such as silk-screening, pad printing, etc., on the surface of said ornament. Another method would be to affix a label to the curved body of said ornament. A label can be affixed to said body by using an adhesive, or some other mechanism, such as heat. Preferably, heat is applied to affix said label to said body by using a process commonly referred to as In Mold Labeling. In Mold Labeling is a process whereby a label is mechanically inserted into the cavity of an injection molding tool at some point during the injection molding phase of said ornament. Said inserted label is therefore directly molded into the body of said ornament. It is believed that In Mold Labeling is a cost efficient method of affixing information to said ornament because it allows one to both mold and affix information to said ornament in one step.

Another method of molding the curved body of said ornament is to die cut said ornament from a flat, flexible sheet of material, and then molding the die cut piece into the desired conical shaped ornament. It is believed said method entails the preprinting of a specified number of the desired shape and related information onto a flat sheet of flexible material. Preferably, each shape is then die cut from the flat sheet by using two heated surfaces which mate. One of the mated surfaces should serve to impart a convex shape to the exterior portion of said ornament, while the other imparts a concave shape to the interior surface of said ornament. The primary function of the heated surfaces is to facilitate molding of the flat, die cut pieces into the desired conical shape. Secondly, it is preferred said surface or surfaces provide a means for cutting said pieces from said flat sheet of flexible material when said surfaces press against said flat material.

It is believed some type of mechanical means, such as an air actuated mechanism, should be utilized to hold the flat, die cut pieces in place between said mated surfaces. Said air actuated feature would ensure said pieces are properly oriented and firmly held in place against said surfaces until the applied heat has molded said pieces into the desired conical shaped ornament.

It is believed this method of molding said ornament is more valuable than injection molding, because it dramatically reduces the time required to print on said ornament. Secondly, this method makes it possible for a manufacturer to conveniently store numerous flat sheets of said printed ornaments until said ornaments are to be molded into finished, conical shaped ornaments. This, in turn, reduces the inventory space required to store said premolded pieces until the subsequent molding process is utilized to convert said flat sheets into finished, molded ornaments.

We have identified some additional beneficial characteristics of the material utilized to mold the curved body of said ornament. Preferably, said flexible material has a degree of tackiness. Said feature is believed to enhance the vacuum adhesive properties of said ornament by improving the vacuum seal formed along said periphery. Secondly, it is desired that said material has a degree of friction generating capabilities. It is believed said property is useful because it will impede the tendency of said compressed ornament to flex out of said shape and slide over a surface of attachment. Therefore, the purpose of said frictional property is to increase the energy barrier required to overcome the adhesive suction force generated when said ornament is compressed.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed:

1. A unitary, one-piece display ornament comprising a *non-symmetrical* flexible sheet material having an overall mass and a center of mass, said ornament having contoured walls which form a convex exterior surface and a concave interior surface, said interior surface having a surface area of from about 3 in.$^2$ to about 25 in.$^2$, both of which surfaces are suitable for displaying a printed message, while said interior surface is capable of adhering to a substrate when compressed against it; said contoured walls also forming a core at the center of mass of the ornament, said center of mass core occupying at least 40% of the total surface area of the ornament and containing at least 50% of the overall mass of the ornament.

2. The ornament of claim 1 wherein the contoured walls form a conical shaped core at the center of mass and has at the periphery a wall thickness of 50% less than the wall thickness at its center of mass.

3. The ornament of claim 2 having the wall thickness tapered gradually from about ⅛ inch thickness at the center of mass to about 1/16 inch at the peripheral wall thickness.

*4. A unitary, one-piece display ornament comprising a flexible sheet material having an overall mass and a center of mass, said ornament having contoured walls which form a convex exterior surface and a concave interior surface, said interior surface having a surface area of from about 3 in.$^2$ to about 25 in.$^2$, both of which surfaces are suitable for displaying a printed message and at least one of said surfaces having a message displayed thereon, while said interior surface is capable of adhering to a substrate when compressed against it; said contoured walls also forming a core at the center of mass of the ornament, said center of mass core occupying at least 40% of the total surface area of the ornament and containing at least 50% of the overall mass of the ornament.*

*5. A unitary, one-piece display ornament comprising a flexible sheet material having an overall mass and a center of mass, said ornament having contoured walls which form a convex exterior surface and a concave interior surface, said interior surface having a surface area of from about 3 in.$^2$ to about 25 in.$^2$, both of which surfaces are suitable for displaying a printed message, while said interior surface is capable of adhering to a substrate when compressed against it; said contoured walls also forming a core at the center of mass of the ornament, said center of mass core occupying at least 40% of the total surface area of the ornament and containing at least 50% of the overall mass of the ornament, wherein said sheet has a shape corresponding to a product and/or a theme of a user of the ornament.*

*6. The ornament of claim 1 wherein the core is a localized region within the ornament.*

*7. The ornament of claim 6 wherein said center of mass core concentrates at least 50% of the overall mass of the ornament within one 40% of the total surface area of the ornament about its center of mass.*

*8. The ornament of claim 1 wherein the core is generally symmetric.*

*9. The ornament of claim 1 wherein the core is generally conical.*

*10. The ornament of claim 4 wherein the message displayed on the ornament includes information relating to advertising or promotional purposes of a user of the ornament.*

*11. The ornament of claim 4 wherein the message displayed on the ornament includes health-related information.*

*12. The ornament of claim 4 wherein said sheet has a shape relating to the message displayed on the ornament.*

*13. The ornament of claim 12 wherein the shape of the sheet and the message displayed on the ornament relate to advertising or promotional purposes of a user of the ornament.*

*14. The ornament of claim 12 wherein the shape of the sheet and the message displayed on the ornament relate to health or emergency information.*

*15. The ornament of claim 4 wherein the message displayed on the ornament is provided on the at least one surface in at least one form selected from a group of forms consisting of: directly printed, silk screened, pad printed, and labeled.*

*16. The ornament of claim 15 wherein the message displayed on the ornament is in-mold labeled on the at least one surface.*

*17. The ornament of claim 5 wherein said shape of the sheet is selected from a group of shapes consisting of a tooth corresponding to a product and/or a theme of a dental business, an apple corresponding to a product and/or a theme of a produce-related business, an animal corresponding to a product and/or a theme of a pet-related business, and a house corresponding to a product and/or a theme of a real estate-related business.*

*18. A unitary, one-piece display ornament comprising a flexible sheet material having an overall mass and a center*

*of mass, said ornament having contoured walls which form a convex exterior surface and a concave interior surface, said interior surface having a surface area of from about 3 in.$^2$ to about 25 in.$^2$, both of which surfaces are suitable for displaying a printed message, while said interior surface is capable of adhering to a substrate when compressed against it; said contoured walls also forming a core at the center of mass of the ornament, said center of mass core occupying at least 40% of the total surface area of the ornament and containing at least 50% of the overall mass of the ornament, wherein said sheet has a shape customized for a select predetermined business.*

*19. The ornament of claim 18 wherein the shape of the sheet corresponds to a product and/or a theme of the business.*

* * * * *

UNITED STATES PATENT AND TRADEMARK OFFICE

CERTIFICATE OF CORRECTION

PATENT NO. : RE 40,244 E
APPLICATION NO. : 11/127018
DATED : April 15, 2008
INVENTOR(S) : Sheffield, Jr. et al.

It is certified that error appears in the above-identified patent and that said Letters Patent is hereby corrected as shown below:

Column 6,

Line 29, “one” should read --about--.

Signed and Sealed this

Twenty-fourth Day of March, 2009

JOHN DOLL
*Acting Director of the United States Patent and Trademark Office*